Patented May 1, 1951

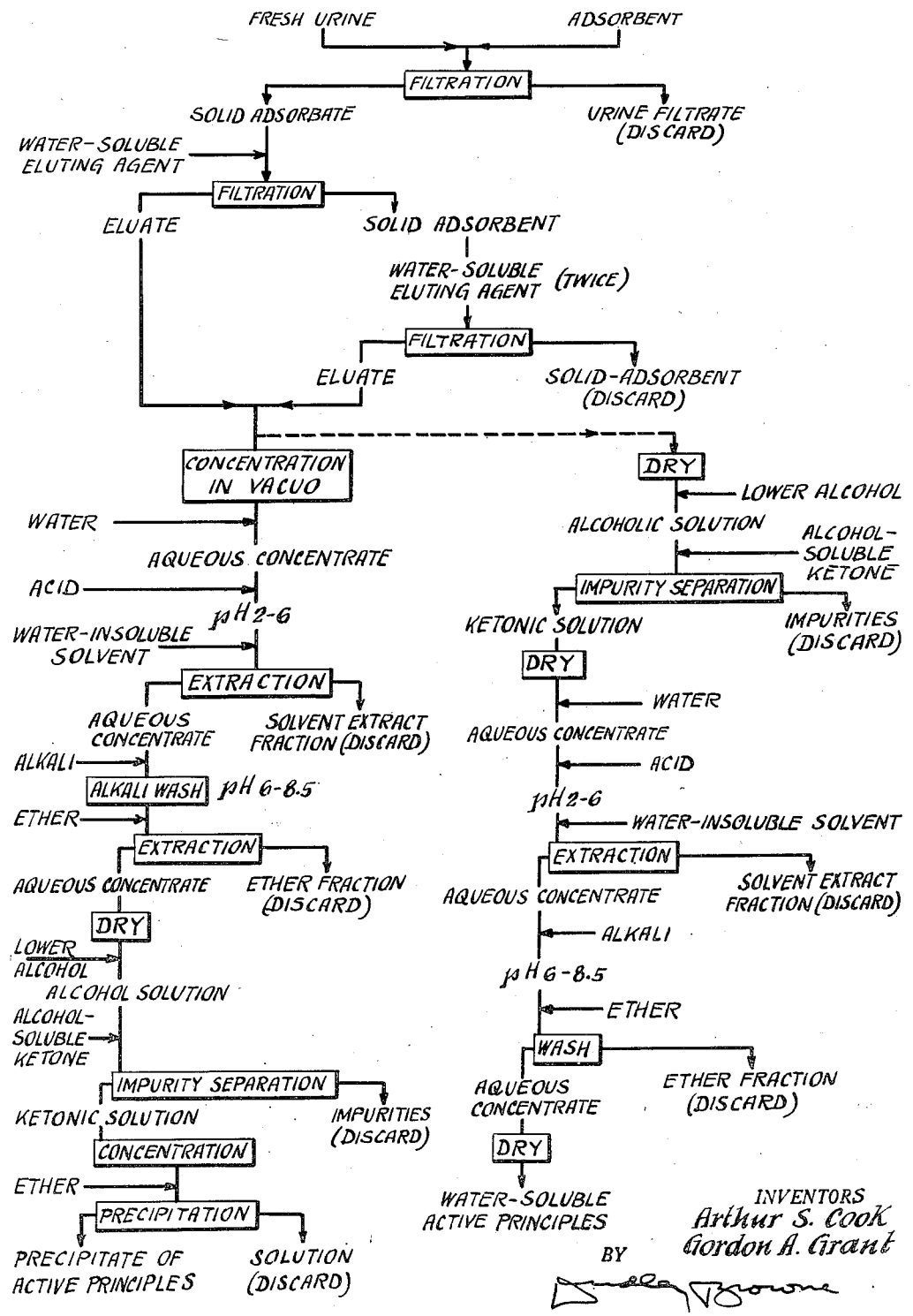

2,551,205

UNITED STATES PATENT OFFICE 2,551,205

PROCESS FOR PREPARING OESTROGENIC HORMONES FROM URINE

Arthur Stanley Cook and Gordon A. Grant, Montreal, Quebec, Canada, assignors to Ayerst, McKenna & Harrison, Limited, Montreal, Quebec, Canada, a corporation of the Dominion of Canada Application October 1, 1947, Serial No. 777,370

5 Claims. (Cl. 167—74.5)

Introduction

This invention relates to water-soluble oestrogenic hormone preparations derived from equine urine, for example, that of a stallion or pregnant mare. This application is a continuation-in-part of application S. N. 536,960 filed May 23, 1944, now Patent No. 2,429,398. The product of the invention is distinguished generally from the many water-insoluble oestrogenic hormone preparations by its substantial insolubility in water-insoluble organic solvents such as benzol and ether, its substantial solubility in water, its high stability in storage, therapeutic nontoxicity, and the ability to produce vaginal cornification in adult ovariectomized rats and to alleviate the menopausal syndrome in humans.

Clinically applicable water-soluble substances having the above characteristics and high oral oestrogenic activity may, for example, be derived by concentrating urine, while still fresh and thus unhydrolyzed, or suitably preserved to prevent hydrolysis. This concentration may conveniently be accomplished by adsorption with an adsorbent and subsequent elution with a water-soluble organic solvent. The adsorbent material may be charcoal, fuller's earth, calcium triphosphate or an adsorbent clay, with charcoal preferred. The eluting agent may be an organic nitrogen-containing base by choice, pyridine or a mixture of an alcohol and chloroform. Then, the eluate is concentrated by removal of the solvent and the largely aqueous concentrate so obtained is preferably treated with a water-immiscible organic solvent such as benzol and/or ether, so as to remove substances soluble in the said solvent. This procedure is taught in our Patent No. 2,429,-398.

The important aspects of the patented procedure described are that the starting material is unhydrolyzed and that conditions are maintained throughout the process to prevent hydrolysis of the active principles. For example, the temperature is preferably maintained at a relatively low level of say from about 40° C. to about 50° C. The time of treatment at above room temperature is kept as short as possible and the pH is maintained within the neutral to mildly alkaline range, say from about 7 to about 8.5.

The resulting product of the said patent was an aqueous concentrate (containing about 20% solids) or, if dried, a water-soluble powder containing substantially all the water-soluble oestrogenic activity and other therapeutic principles of the original urine and generally from about 1 to about 2% of the original urinary solids. The product contained substances rendering it stable and at the same time, it was free from toxicity in a therapeutic sense when used at dosage levels satisfactory to alleviate the symptoms of the menopausal syndrome.

However, when necessary to administer orally such oestrogenic material at a very high dose level in particular therapy, it has been found that the above preparation may in certain cases cause nausea and other gastric disturbances. The applicants have now discovered that the factors responsible for such disturbances can be removed without substantial loss of oestrogenic and other therapeutic principles and without loss of stability.

It has been found that compounds which cause nausea and other gastric disturbances are certain fats, oils, phenols, alkyl-substituted phenols, etc., which are present as salts. To remove these substances, the concentrated oestrogenic material is brought to an acid pH thus releasing or liberating the oils, fats and free bases and this is followed by solvent washing using a solvent in which the toxic oils and phenolic substances are selectively soluble while the desired oestrogenic compounds are substantially insoluble.

According to a preferred embodiment of the present invention the aqueous concentrate obtained by concentration of the water-solvent eluate as described above and in Patent No. 2,429,398 is treated as follows. The pH is adjusted to within the range from about 2 to about 6, preferably from about 4 to about 5. The concentrate is then washed with a water-immiscible organic solvent, the temperature being maintained preferably within the range from about 15° C. to about 20° C., although other conditions being propitious, this temperature can rise to 40° C. The washing or extraction is carried out as fast as possible, the activity remaining in the aqueous phase. The important thing is to coordinate the conditions so as to prevent hydrolysis. An aqueous extract containing the water-soluble oestrogenic substances and other therapeutic principles and free from much of the bulk and undesirable impurities is thus obtained. The extract is then neutralized to a pH from about 7 to about 8. At this stage it can be washed with an ether to remove excess solvent, but this is an optional step. The neutralized extract is then dried, preferably by distillation in vacuo at a temperature within the range from about 40° C. to about 50° C., to form a substantially dry residue.

This residue has surprisingly high oral oestrogenic activity and is characterized by the absence of substantially water-immiscible solvent-soluble substances which are odoriferous and produce gastric disturbances and nausea in certain individuals. This product is capable of clinical use, but the applicants prefer to process it further as will be described. Further, crude products may be derived by processing in accordance with the teachings of the present application, cruder materials than the preferred starting materials above defined.

The oestrogenically active residue is dissolved in a small amount of a lower alcohol and the solution treated with a ketonic solvent to form a precipitate containing very little of the activity. Further quantities of the odoriferous and toxic factors characteristic of crude urine concentrates, and inert solids are thus removed in the precipitate, which contains little oestrogenic activity. The supernatant liquid containing the activity in solution in the alcohol-ketone mixture is separated and concentrated to dryness. The dried residue may again be dissolved in a lower alcohol and the active principles precipitated by the addition of an ether. This removed in the extracting solution more undesirable factors particularly toxic substances and oils. The precipitate is separated and washed with an ether and then dried. The dried precipitate contains a large proportion of the water-soluble oestrogenic substances of the starting concentrate. It might be explained that where a lower alcohol is mentioned, one containing 5 carbon atoms or less is intended, with methyl or ethyl alcohol being preferred.

The water-immiscible organic solvent extraction and ketonic precipitation steps have the unexpected effect of removing inert solids, toxic and odoriferous substances, while not reducing to nearly the extent which might reasonably be expected the water-soluble oestrogenic activity or removing or inactivating factors producing stability. The applicants' product differs from pure oestrone sulphate by its stability and enhanced therapeutic effect. Thus a feature of the process is the ability to yield a product containing water-soluble oestrogenic substances in a concentrated yet stable form.

While the applicants have described a preferred procedure in which the water-insoluble solvent washing is used first, and the ketonic precipitation later, it is also possible to reverse the order of these steps. Other modifications are also possible within the general teachings of the present application.

The invention will be more completely understood by reference to the following examples illustrating preferred procedures and to the drawing.

The drawing shows a flow sheet which represents a complete process together with a modification thereof.

Example 1

About 25 gallons of urine freshly obtained from pregnant mares and containing water-soluble oestrogenic activity were preserved with an alcohol-chloroform mixture.

About 560 grams of activated carbon was added and the mixture stirred mechanically for about 15 minutes at a suitable temperature, e. g. between about 15° C. and about 30° C. The carbon was filtered off. The urine filtrate was re-treated with carbon. The carbon adsorbing agents containing the oestrogenic activity were combined. Substantially all the water-soluble oestrogenic substances had been removed from the urine by this adsorption step. In one procedure the carbon was then dried, in another it was left wet, e. g. the charcoal can be used right after filtration or it can be dried and used later.

About three liters of an aqueous solution containing about 90% pyridine was added to the carbon (dry or wet) and mixed thoroughly at about room temperature. This mixture was stirred and then allowed to stand in the refrigerator several hours. The carbon was then filtered off and resuspended in about two liters of fresh pyridine solution (about 90%). It was again allowed to stand for several hours with occasional stirring. The carbon was then filtered off. The carbon was suspended again in about two liters of pyridine solution and then sucked dry.

The pyridine extract and washings obtained in the above manner, amounting now to about eight liters were combined and concentrated in vacuo at a low temperature between about 40° C. and about 50° C. to 250 cubic centimeters. During the final stage of preparation in which the pyridine was being removed and the largely aqueous concentrate obtained, the reaction of the mixture was not allowed to become acid. About 250 cubic centimeters of water were added. This solution was a concentrate and contained a substantial proportion of the water-soluble oestrogenic substances of the original urine.

About 400 ml. of the concentrate, prepared as described above, containing water-soluble oestrogenic potency equivalent to 19 mg. sodium oestrone sulphate per ml. (as determined by the modified Marrian-Kober test) was acidified to pH 4 with 15% aqueous sulphuric acid and extracted four times with 160 ml. of ethylene dichloride (each extraction) and three times with 80 ml. of ethylene dichloride (each extraction). The solvent extracts were discarded. The aqueous concentrate was then adjusted to pH 6.9 with 5 N sodium hydroxide and extracted three times with 100 ml. (each extraction) of ether. The aqueous concentrate thus freed from odoriferous oils, phenols and toxic materials was then concentrated to dryness in vacuo. This procedure was carried out at room temperature and as quickly as possible to avoid hydrolysis of the active substance by the acid conditions necessary for the water-insoluble solvent treatment.

For further purification, the aqueous concentrate was dried by heating and the dried residue was dissolved in 160 ml. of methanol. Undesired material was precipitated by pouring into two liters of acetone. The methanol-acetone solution was filtered and in this way 61 gms. of solids comprising inactive insoluble material was removed. The solution containing the desired water-soluble oestrogenic substances was then concentrated to a small volume in vacuo and active principles precipitated by pouring into two liters of ether. The precipitate was filtered off and dried in vacuo. It weighed 29.9 gms. It contained water-soluble oestrogenic activity equivalent to 20.5% sodium oestrone sulphate measured by the modified Marrian-Kober test.

This represents 81% recovery of the oestrogenic potency of the concentrate in a water-soluble form.

The resulting product is a pharmaceutically useful substance suitable for clinical use on oral administration. It is more active when administered orally than free oestrone in alleviating the menopasal syndrome in humans, and when administered to ovariectomized adult rats in causing vaginal cornification. It is stable. It is substantially insoluble in water-immiscible organic solvents, for example benzol and ether. It is water-soluble. It is free from substances soluble in ethylene dichloride and is free from substances insoluble in acetone.

Example 2

100 cc. of the concentrate prepared as in Example 1 prior to the pH adjustment step to an acid point (pH 4) were taken to dryness in vacuo and extracted with acetone. The acetone solution was concentrated to dryness in vacuo and the residue dissolved in water and adjusted with 15% sulphuric acid to pH 4, and extracted with four equal volumes of ethylene dichloride. The aqueous solution was adjsted to pH 7, washed with an equal volume of ethyl ether and the excess ether removed in vacuo. The resulting aqueous concentrate contained over 90% of the original water-soluble oestrogenic activity of the starting concentrate as measured by the modified Marrian-Kober test. It was concentrated in vacuo to dryness and yielded a buff colored amorphous powder which was readily soluble in water and effectively free from odoriferous substances.

Example 3

To test for stability of the oestrogenic product obtained as described, 100 cc. of a 15% aqueous alcohol solution of the purified concentrate contained 600 Collip units were assayed orally on immature rats for its oestrogenic potency. The solution of the concentrate was stored in a stoppered 4 ounce glass bottle at 37° C. for a period of four months. During this period, the solution was assayed repeatedly three times (end of first month, second month and fourth month). Within the error of the biological assay, there was no evidence of deterioration.

It will be understood that the specific procedures and products exemplified are susceptible to certain modification without departing from the spirit of the invention. The following remarks, although not exhaustive, will be of guidance to certain of the modifications of which the subject matter is capable.

The products of this invention are preferably prepared by first concentrating unhydrolyzed equine urine under conditions to prevent hydrolysis so as to form a concentrate containing a water-soluble oestrogenic substance, extracting the concentrate with an organic water-soluble solvent for the substance under conditions to prevent hydrolysis so as to obtain an extract containing said substance, and concentrating the extract under conditions to prevent hydrolysis. Preferably this process is effected by absorbing an unhydrolyzed urinary liquid with an adsorbent, preferably activated carbon, and maintaining a moderate temperature and a pH within a range from substantially neutral to mildly alkaline (preferably about 7 to about 8), and then eluting from the absorbent under similar conditions with an organic water-soluble solvent for the substance.

The product resulting in a water-soluble substance insoluble in benzol and ether, and containing substantially all the water-soluble oestrogenic activity of the original urine and usually less than about 2% of the original urinary solids. It contains no substantial quantity of free oestrogens. The product is stable. However, it still contains inactive and odoriferous substances and substances producing gastric disturbances and nausea in some individuals.

In the washing or solvent extration step using a water-insoluble solvent, the pH range of from 2 to 6 is critical. Superior results are obtained within the preferred range from 4 to 5. In order to hold any hydrolysis to the absolute minimum it is desirable to operate rapidly and at a low temperature, preferably within the range from 15° C. to 20° C. and in any case not higher than 40° C. for any length of time. The washing or extraction step is usually repeated several, preferably 4 to 6 times.

The extractants are substantially water-immiscible organic solvents for fats and oils, for phenols, for alkyl-substituted phenols, and for unconjugated sterols. The solvents having these specific characteristics and effective for the purpose desired may be found among the hydrocarbons including the aliphatics such as hexane and higher, the aromatics such as benzene, toluene, etc.; the alicyclics such as cyclohexane; or the chlorinated hydrocarbons such as chloroform, ethylene dichloride, trichlorethylene, carbon tetrachloride or chlorobenzene. In summation, the essential characteristics required in the solvent are that the water-soluble, orally active oestrogenic conjugates be substantially insoluble in the solvent when operating in an acid environment; that the solvent be substantially water-insoluble; and that the solvent possesses substantial solvent action for fat, oils and free phenolic compounds.

Of the solvents mentioned, chlorinated hydrocarbons are preferred, particularly ethylene dichloride, because the applicants have found that surprisingly little of the oestrogenic activity is extracted by these solvents. Moreover, these solvents are non-inflammable and thus better adapted for large-scale processes.

The solution after extraction is neutralized to a pH from substantially neutral to mildly alkaline. The applicants prefer to operate within the range from 6 to 8.5 and more particularly from 7 to 7.5. Neutralization may be effected by the use of an alkali, preferably sodium hydroxide or potassium hydroxide.

Washing the neutralized solution with an ether is an optional step, but the applicants have found it to be of considerable advantage in that it removes any remaining water-immiscible solvent. Isopropyl or ethyl ether, or other solvent for the water-immiscible solvent may be employed.

The drying step is to remove water and to render the active material suitable for further treatment. One of the preferred methods of drying is in vacuo at a temperature from about 40° C. to about 50° C.

The dried product is dissolved in a lower alcohol such as methyl alcohol and the undesired material is precipitated with an alcohol-soluble, ketonic solvent. As examples of ketonic solvents suitable for the purpose may be mentioned lower-alkyl ketones such as acetone, methyl ethyl ketone, etc. The preferred ketone however is acetone. Surprisingly, this step has been found to separate out large amounts of ketone-insoluble material which the applicants have found contains little potency and to leave ketone-soluble material which the applicants have found contains the potency. The step is carried out by adding an excess of the ketonic solvent gradually, with stirring, until no further insoluble precipitate is being formed. Desirably, room temperature is maintained. The supernatant liquid containing the oestrogenic activity is removed by filtration or centrifugation and is then concentrated.

The resulting concentrate is dissolved in alcohol and poured into an excess of an ether, ethyl or isopropyl ether being preferred. This forms a precipitate containing the oestrogenically active substance, the ether-soluble oils and phenolic substances remaining in the supernatant liquid. The potent precipitate is separated and preferably washed with ether, then dried.

The product of the invention prepared as above has the following characteristics:

Physical nature:
(a) As a solid an amorphous powder
(b) As an aqueous solution.

The product contains a plurality of water-soluble oestrogenic substances, organic nitrogen compounds, for example, indoxyl sulphate and also a substantial amount of alkaline-soluble fractions.

Chemical characteristics:
(a) Practically insoluble in water-immiscible organic solvents, e. g. ether, benzol.
(b) Substantially free from fat solvent soluble material.
(c) Substantially free from phenolic substances.
(d) Soluble in water, alcohol, acetone, pyridine, methyl alcohol.
(e) Hydrolysis of the product by heat, acid, or alkali, results in the liberation of free oestrogenic substances immiscible in water and soluble in organic solvents, such as ether or benzol.

Stability:
Stable as a dry powder or in aqueous solution at room temperature against auto-hydrolysis.

Aesthetic qualities:
Practically free from objectionable odour, and taste, and factors which cause intestinal disturbances and nausea.

Pharmacological effect:
(a) More effective orally than free oestrone for alleviation of the menopausal syndrome.
(b) More effective than oestrone sulphate in oral menopausal therapy.
(c) Free from toxicity at therapeutic levels of dosage.
(d) Alleviates common autonomic and emotional symptoms accompanying the menopausal syndrome.
(e) Approximately two to two-and-one-half times as active as the equivalent amount of free oestrone in producing vaginal cornification when administered orally to the adult ovariectomized rats.

Clinically, the product has a greater activity than accounted for by the apparent sodium oestrone sulphate content as measured by the modified Marrian-Kober test. (Colorimetric estimation) described in "The Elimination of Estrin in Urine with the Photo-Electric Colorimeter" by E. H. Venning et al. (J. B. C. 120, 225 (1937).

The hydrogen ion concentrations (pH) mentioned herein were measured on the Beckman Laboratory model glass electrode pH meter with no correction for metallic ion concentration.

It will be understood that, without departing from the spirit of the invention or the scope of the claims, various modifications may be made in the specific expedients described. The latter are illustrative and not offered in a restricting sense, except as may be required by the state of the prior art.

We claim:

1. A process for the preparation of a water-soluble oestrogenically active composition comprising concentrating a substantially unhydrolyzed equine urinary extract containing water-soluble oestrogenic activity under substantially non-hydrolyzing conditions, acidifying said concentrate to within a pH range from about 2 to about 6, quickly extracting the acidified aqueous material with a substantially water-immiscible solvent of the group consisting of hydrocarbons and chlorinated hydrocarbons to cause separation of undesired material such as oils and phenols into the solvent while leaving the desired, water-soluble oestrogenically active principles in the aqueous phase, rapidly separating the aqueous phase containing the desired principles in purified and concentrated form from the solvent fraction, and then neutralizing the aqueous concentrate to a point where hydrolysis is at a minimum.

2. A process for the preparation of a water-soluble oestrogenically active composition comprising concentrating a substantially unhydrolyzed equine urinary extract containing water-soluble oestrogenic activity under conditions to avoid substantial hydrolysis, acidifying said concentrate to within a pH range from about 4 to about 6, quickly extracting the acidified aqueous material with a substantially water-immiscible solvent of the group consisting of hydrocarbons and chlorinated hydrocarbons to cause separation of undesired material such as oils and phenols into the solvent while leaving the desired, water-soluble oestrogenically active principles in the aqueous phase, rapidly separating the aqueous phase containing the desired principles in purified and concentrated form from the solvent fraction, and then neutralizing the aqueous concentrate to a pH of about 7 to about 8 where hydrolysis is at a minimum.

3. The process of claim 1; wherein the water-immiscible solvent is ethylene dichloride.

4. The process of claim 1; wherein the neutralized aqueous concentrate is extracted with diethyl ether.

5. A process for the preparation of a water-soluble oestrogenically active product comprising, contacting substantially unhydrolyzed pregnant mares, urine with an adsorbent, eluating the desired oestrogenic potency from the adsorbent, concentrating the eluate to form an aqueous concentrate having oestrogenic activity, said steps being carried out under conditions to avoid substantial hydrolysis, acidifying said concentrate to within a pH range of about 4 to about 6, quickly extracting the acidified aqueous material with ethylene dichloride in which undesired material such as oils and phenols are soluble, rapidly separating the aqueous phase containing the desired principles from the solvent fraction, neutralizing the purified aqueous concentrate to a pH in the neighborhood of about pH 7 to about 8, extracting the neutralized product with ether and discarding the the ether fraction, dissolving the purified concentrate in a lower alcohol, adding an alcohol-soluble, lower-alkyl ketone thus precipitating impurities from the alcoholic solution, and then concentrating the alcohol-ketone solution to remove substantially all of the solvents leaving a concentrated oestrogenic fraction as the desired product.

A. STANLEY COOK.
G. A. GRANT.

(References on following page)

REFERENCES CITED

The following references are of record in the file of this patent:

UNITED STATES PATENTS

| Number | Name | Date |
|---|---|---|
| 1,928,830 | Dohrn | Oct. 3, 1933 |
| 2,190,248 | Wollheim | Feb. 13, 1940 |
| 2,196,295 | Eberlein | Apr. 9, 1940 |
| 2,292,841 | Necheles | Aug. 11, 1942 |
| 2,363,549 | Rabinowitz | Nov. 28, 1944 |
| 2,429,398 | Cook | Oct. 21, 1947 |

FOREIGN PATENTS

| Number | Country | Date |
|---|---|---|
| 459,536 | Great Britain | Jan. 11, 1937 |
| 460,137 | Great Britain | Jan. 15, 1937 |

OTHER REFERENCES

Katzman in J. Biol. Chem. Nov. 1932, pages 739–754.

New and Nonofficial Remedies, 1945, page 440.